UNITED STATES PATENT OFFICE.

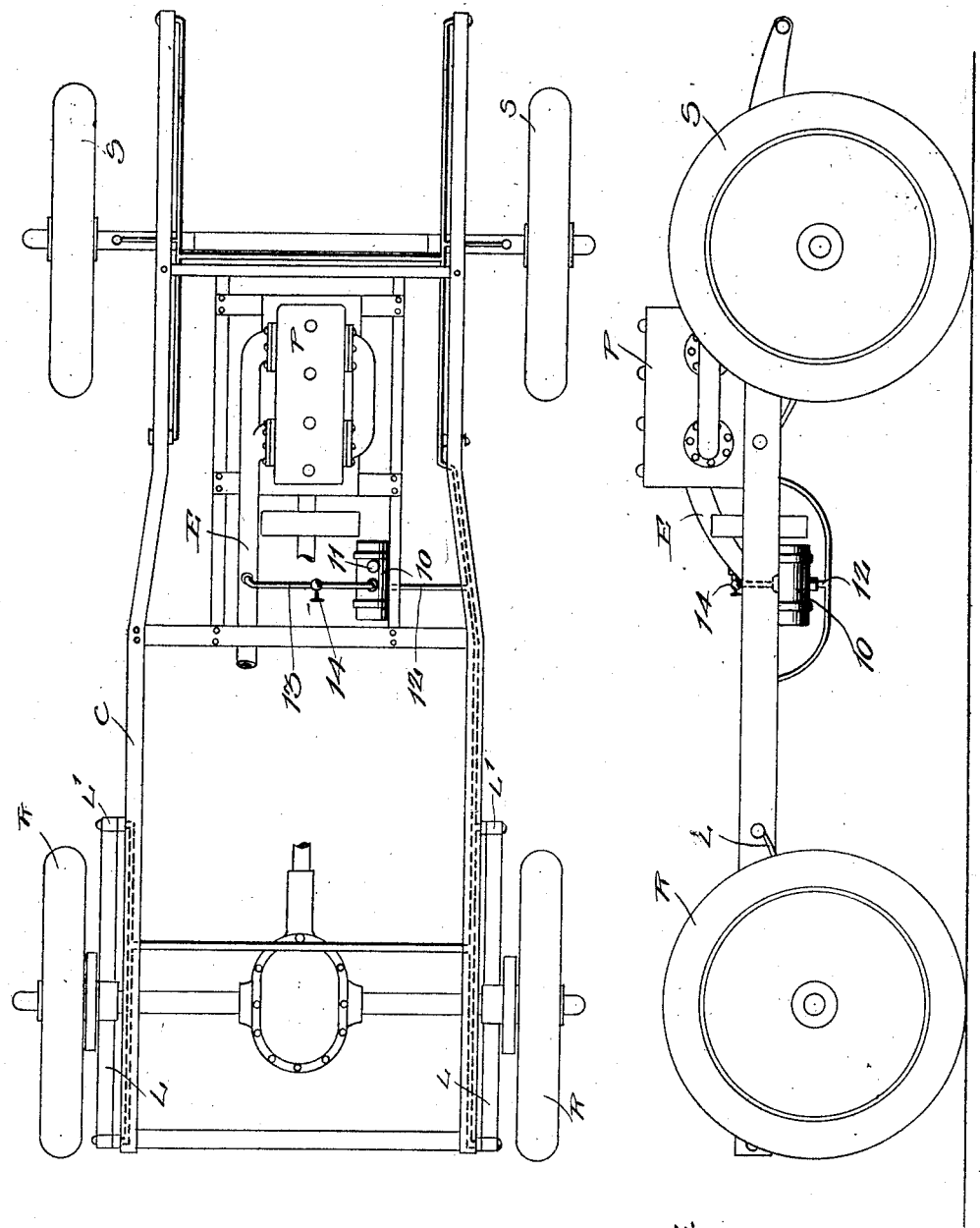

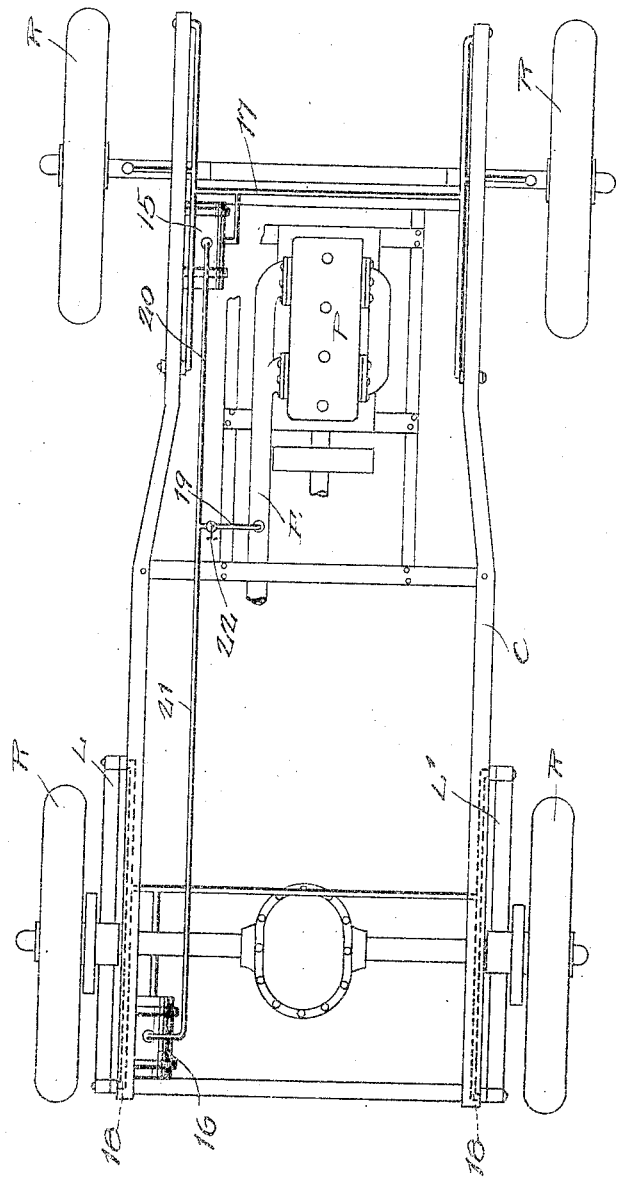

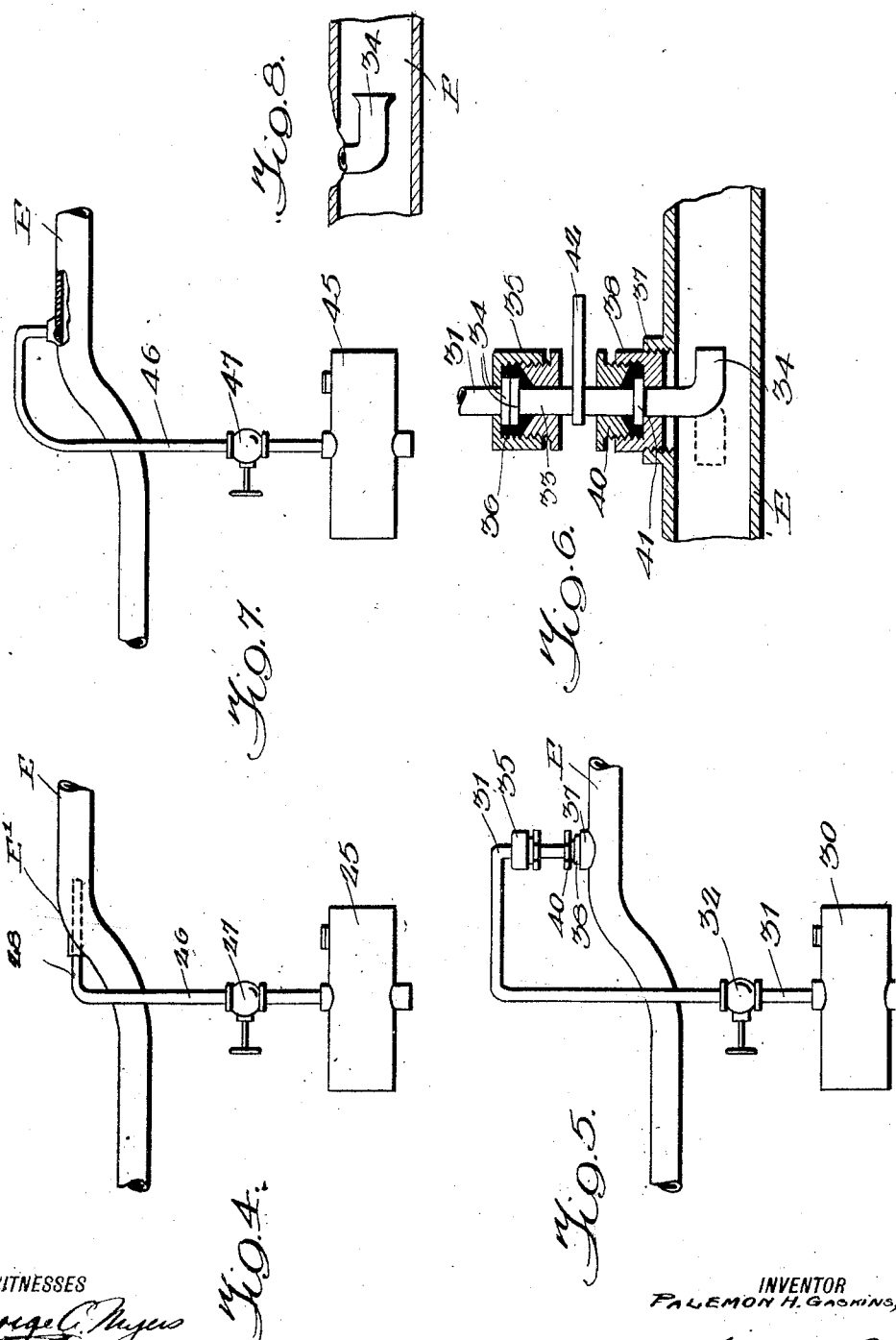

PALEMON H. GASKINS, OF JACKSONVILLE, FLORIDA.

LUBRICATING SYSTEM.

1,411,914.

Specification of Letters Patent.   Patented Apr. 4, 1922.

Application filed January 17, 1921. Serial No. 437,910.

*To all whom it may concern:*

Be it known that I, PALEMON H. GASKINS, a citizen of the United States, and a resident of Jacksonville, in the county of Duval and State of Florida, have invented certain new and useful Improvements in Lubricating Systems, of which the following is a specification.

The present invention relates in general to lubricating systems, and more particularly to lubricating systems especially adapted for motor vehicles.

The object of the invention is to provide a lubricating system of this character which insures a proper distribution and application of lubricant to the various elements of the vehicle, such as the chassis, spring suspension, steering mechanism, and other mechanisms and elements thereof, which is adapted to utilize forces and instrumentalities readily available and especially adapted for such purposes, and is especially adapted to utilize the forces presented by the exhaust of the power plant of the vehicle, which does not feed an excess of lubricant or feed the lubricant when the vehicle is not in use, and which is of simple and durable construction, reliable in operation, and easy and inexpensive to manufacture and apply.

Other objects and advantages reside in the certain novel features of the construction, combination and arrangement of parts which will be hereinafter more fully described and particularly pointed out in the appended claims, reference being had to the accompanying drawings forming a part of this specification, and in which:

Figure 1 is a plan view of an embodiment of the invention, parts being shown diagrammatically for the sake of illustration, Figure 2 is a similar view in side elevation, Figure 3 is a plan view of an embodiment of a multiple unit type, Figure 4 is a detail view illustrating diagrammatically the form in which the pressure and kinetic energy of the exhaust gases is utilized, Figure 5 is a similar view of a modified form of system utilizing both kinetic energy and pressure.

Figure 6 is a detail view of the controlling means utilized with the form illustrated in Figure 5, Figure 7 is a diagrammatic view of another form of the invention utilizing only the pressure of the exhaust gases.

Figure 8 is a detail view of a modified form of orifice for the inlet tube especially adapted for use with the form of the invention shown in Figures 5 and 6.

Referring to the drawings wherein for the sake of illustration is shown the preferred embodiments of the invention, the motor vehicle with which the invention is associated may be of any standard or conventional type, and in all embodiments preferably includes a chassis C, running gear including drive wheels R, and front steering wheels S, controlled by any conventional steering mechanism, a suitable spring suspension embodying leaf springs L having shackle connections L' to the side members of the chassis, and an engine or power plant P having an exhaust including an exhaust manifold or conduit E.

In the form of the invention shown in Figures 1 and 2, there is provided a single reservoir designated at 10 and having a suitable filling opening closed by a plug 11 whereby it may be filled with lubricant. The reservoir is arranged below the level of the lowest of the points to be lubricated so that it is only when some extrinsic force is applied that the lubricant will be discharged from the tank 10 to such points. For conveying the lubricant from the reservior to the various elements of the vehicle to be lubricated, suitable conveying devices such as pipes 12 are provided, and extend from the tank along the chassis as shown in Figure 1.

Means is provided for utilizing the exhaust gases to effect a feed of the lubricant through the conveying devices to the points to be lubricated, and includes a pipe connection 13 extending between the exhaust conduit E and the reservoir 10. The exhaust gases are transmitted through the pipe 13 and operate upon the lubricant in the tank 10 to feed the same as desired. A shut-off cock 14 is incorporated in the pipe connection 13. The precise manner in which the exhaust gases are utilized to effect this feed of the lubricant will be hereinafter more fully described.

In the form of the invention shown in Figure 3, a multiple unit system is employed, and includes a forward tank or reservoir 15 arranged at the front of the vehicle as shown in Figure 3 and a rear tank or reservoir 16 arranged at the rear of the vehicle. These reservoirs like the reservoir 10 in the first embodiment, are both arranged below the level of the lowest of the points to be lubricated, and the lubricant will not be fed therefrom except when some extrinsic force operates upon the lubricant. A separate set of conveying devices such as pipes 17 and 18 are organized with each reservoir so that the instrumentalities at the front of the vehicle are lubricated from the front or forward tank 15, while the instrumentalities at the rear of the vehicle are lubricated from the rear tank 16.

Means is provided for effecting a feed of the lubricant from the tanks 15 and 16 through the conveying devices 17 and 18, respectively, and includes a pipe connection 19 tapped at one end into the exhaust conduit E and terminating at its other end in branches 20 and 21 leading to the reservoirs 15 and 16, respectively. A shut-off cock 22 is incorporated in the pipe 19 whereby the feed of the lubricant may be cut off when desired. The precise mode or manner in which the exhaust gases are utilized to effect a feed of the lubricant will be hereinafter more fully described, it being understood that these gases are transmitted through the pipe 19 and branches 20 and 21 to the reservoirs 15 and 16 respectively.

Referring now especially to Figure 4, wherein is illustrated one mode of utilizing the exhaust gases, the numeral 25 designates the tank or reservoir for the lubricant. This tank may correspond to either the tank 10 in the form shown in Figures 1 and 2, or the tanks 15 and 16 shown in the form illustrated in Figure 3. A pipe connection 26 leads from the tank to the exhaust conduit E and a shut-off cock 27 is incorporated in this pipe connection. The end of the pipe connection 26 remote from the reservoir 25 terminates in an inlet tube 28 which enters the exhaust tube E through a suitable opening formed in a bend E' provided in the gas conduit. The inlet tube is thus axially arranged within the exhaust conduit and has its open end or mouth adapted to intercept or trap the exhaust gases in such manner that not only the pressure but also the kinetic energy of the gases are utilized to effect a feed of the lubricant.

The embodiment shown in Figures 5 and 6 is also adapted to utilize the pressure and the kinetic energy to a variable degree, and may be utilized with either the arrangement shown in Figures 1 and 2 or the arrangement shown in Figure 3. In this form, a tank or reservoir 30 is provided which corresponds either to the reservoir 10 or the reservoir 16 or 17, and a pipe connection 31 having a shut-off cock 32 embodied therein leads from the reservoir to the exhaust conduit E. The rotatable inlet tube 33 is arranged at the end of the pipe connection adjacent the exhaust conduit and extends radially into the conduit. Within the conduit the inlet tube is provided with an angular mouth or orifice 34 which extends axially or parallel to the axis of the conduit, and which is arranged to trap or intercept the exhaust gases so as to utilize the pressure and the kinetic energy to a variable degree. The end of the pipe connection 31, and the abutting end of the inlet tube 33 are provided with abutting flanges 34 and these flanges are maintained in engagement by a suitable coupling 35, embodying packing 36 whereby they are rendered gas-tight. The inlet tube 33 is entered into the exhaust conduit through an internally threaded flanged opening 37 in which the socket member 38 of a coupling member threads. This socket member also includes a suitable packing 39 maintained in place by a gland 40 to maintain the last mentioned connection gas-tight. A collar 41 fixed or otherwise suitably secured to the inlet tube 33 bears against the socket member 38 to limit the inward movement of the inlet tube through the opening in the socket. In order to vary the degree with which the inlet tube acts to avail the system of the kinetic energy of the exhaust gases, means is provided for varying the position of the mouth or orifice 34 thereof with respect to the direction of travel of these gases, and preferably comprises a lever 42 fixed to the inlet tube between the coupling members and adapted to facilitate turning of the inlet tube to desired position. In this way the inlet tube may be so positioned as to avail itself of the maximum positive kinetic energy of the gases or of the negative effect of the gases by a turning of the lever through 180°.

In the form shown in Figure 7 the reservoir is designated at 45, and as in the other forms they may correspond to either the reservoir 10 of the embodiment shown in Figures 1 and 2 or the reservoirs 15 or 16 in the embodiment shown in Figure 3. The reservoir 45 is connected to the exhaust conduit E by means of a pipe connection 46 in which is incorporated a shut-off cock 47. The end of the pipe connection remote from the reservoir simply leads into the exhaust conduit so that it serves to transmit to the reservoir only the pressure of the exhaust gases and not the kinetic energy thereof. To this end, the connection leads radially into the exhaust conduit and has no mouth or orifice extending axially as in the other embodiments.

In all forms and embodiments of the invention, the exhaust gases are utilized to effect a forced feed of the lubricant. In the form shown in Figure 4, both the pressure and the kinetic energy of the exhaust gases are made use of; in the form shown in Figures 5 and 6 the pressure and the kinetic energy are also made use of, but the degree of the kinetic energy made use of is varied by manipulating the lever 42, and in the embodiment shown in Figure 7 only the pressure is utilized and the kinetic energy is in no way made use of. It is to be understood that either of the forms shown in Figures 4, 5 and 6, or 7 may be utilized with either the embodiment shown in Figures 1 and 2 or the embodiment shown in Figure 3, as these first mentioned forms vary only in the manner in which they utilize the forces of the exhaust gases, the first two mentioned forms utilizing both the pressure and the kinetic energy, and the last mentioned using the pressure.

In Figure 8 there is shown a modified form of mouth or orifice for the inlet tube. In this form of inlet tube the mouth or orifice is flared or widened so as to more effectively intercept or trap the gases.

I claim:—

1. In a lubricating system for use with motor vehicles including a power plant having an exhaust conduit, a reservoir for the lubricant arranged below the level of the points to be lubricated, conveying devices from the reservoir to the points to be lubricated, a pipe connection between the exhaust conduit and the reservoir, a shut-off cock in said pipe connection, a rotatable inlet tube having an axially arranged mouth or orifice disposed within the exhaust conduit and adapted to intercept the exhaust gases, means for coupling the rotatable inlet tube to the pipe connection, means for coupling the rotatable inlet tube to the exhaust conduit, and means for adjusting said inlet tube.

2. In a lubricating system for use with motor vehicles including a power plant having an exhaust conduit, a reservoir for the lubricant, conveying devices from the reservoir to the points to be lubricated, a pipe connection between the exhaust conduit and the reservoir, an adjustable inlet tube having an orifice arranged in the exhaust conduit and adapted to intercept the exhaust gases whereby the pressure and kinetic energy in varying degrees is utilized to effect the forced feed of the lubricant.

3. In a lubricating system for use with motor vehicles including a power plant having an exhaust conduit, a reservoir for the lubricant, conveying devices from the reservoir to the points to be lubricated, a pipe connection between the exhaust conduit and the reservoir, a rotatable inlet tube having a mouth or orifice disposed within the exhaust conduit and adapted to intercept the exhaust gases, and means for adjusting said inlet tube.

PALEMON H. GASKINS.